(12) United States Patent
Etherton et al.

(10) Patent No.: US 7,638,597 B2
(45) Date of Patent: Dec. 29, 2009

(54) REMOVAL OF METAL CONTAMINANTS FROM POLYETHYLENE

(75) Inventors: Bradley P. Etherton, Cincinnati, OH (US); Marvin R. Appel, Loveland, OH (US)

(73) Assignee: Equistar Chemicals, LP, Houston, TX (US)

( * ) Notice: Subject to any disclaimer, the term of this patent is extended or adjusted under 35 U.S.C. 154(b) by 262 days.

(21) Appl. No.: 12/002,482

(22) Filed: Dec. 17, 2007

(65) Prior Publication Data

US 2009/0152169 A1    Jun. 18, 2009

(51) Int. Cl.
*C10G 45/00* (2006.01)

(52) U.S. Cl. .................. 528/495; 528/480; 528/481; 528/491; 528/493; 528/496

(58) Field of Classification Search ......... 528/480–481, 528/491, 493, 495–496; 208/251 H, 251 R
See application file for complete search history.

(56) References Cited

U.S. PATENT DOCUMENTS

| | | | |
|---|---|---|---|
| 2,921,057 A * | 1/1960 | Mertzweiller | 528/483 |
| 2,928,817 A * | 3/1960 | Neal et al. | 528/482 |
| 2,955,107 A * | 10/1960 | Lovett et al. | 528/493 |
| 2,978,442 A | 4/1961 | Brightbill et al. | |
| 3,058,800 A | 10/1962 | Frevel et al. | |
| 3,098,845 A * | 7/1963 | Cull et al. | 528/493 |
| 3,218,266 A | 11/1965 | Ludlum | |
| 3,281,399 A | 10/1966 | Renaudo et al. | |
| 3,483,338 A | 12/1969 | Bould et al. | |
| 3,725,300 A | 4/1973 | Stamm | |
| 4,156,075 A | 5/1979 | Holliday et al. | |
| 4,430,488 A | 2/1984 | Zboril | |
| 4,803,259 A | 2/1989 | Zboril et al. | |
| 5,185,448 A | 2/1993 | Odorisio et al. | |
| 5,236,998 A | 8/1993 | Lundeen et al. | |
| 5,426,175 A | 6/1995 | Sutherlin et al. | |
| 6,221,985 B1 | 4/2001 | Gao et al. | |
| 6,756,455 B2 | 6/2004 | Nagy et al. | |

* cited by examiner

*Primary Examiner*—Glenn A Caldarola
*Assistant Examiner*—Brian McCaig
(74) *Attorney, Agent, or Firm*—John Tyrell; Jonathan L. Schuchardt

(57) ABSTRACT

A process to remove metal contaminants from a hydrocarbon solution of polyethylene is disclosed. The process comprises adding a primary alcohol and a β-diketone to a solution of polyethylene at a temperature within the range of 120° C. to 300° C. and contacting the solution with basic alumina. The process removes metal contaminants and minimizes degradation and condensation products, which can have a detrimental effect on polyethylene properties. The process provides polyethylene with low metal residues and good properties.

11 Claims, No Drawings

REMOVAL OF METAL CONTAMINANTS FROM POLYETHYLENE

FIELD OF THE INVENTION

This invention relates to a process to remove metal contaminants from a hydrocarbon solution of polyethylene. The process provides polyethylene with low metal levels and good properties.

BACKGROUND OF THE INVENTION

Many olefin polymerization catalysts are known, including single-site and Ziegler-Natta catalysts. Both types are based upon transition metals. Typically, other metallic compounds are also used. For example, single-site catalysts generally use aluminum compounds as activators and Ziegler-Natta catalysts typically use an aluminum compound that serves as a cocatalyst. Other metals, such as compounds of magnesium or zinc, are also commonly used in ethylene polymerizations. Generally, these metal contaminants are left in the polyethylene. Depending upon the amount, this can present a problem for certain end-use applications.

Residual metal contaminants are more of an issue with polyethylene prepared by certain processes. For example, solution processes are performed at relatively high temperatures and often require higher catalyst loadings. There have been several attempts to solve this problem by adding various compounds and passing them through an adsorbent such as alumina. Other attempts add a catalyst deactivator and either use other separation techniques or do not remove the metal contaminants.

U.S. Pat. No. 3,281,399, for example, adds an alkylene oxide to a solution of polyethylene and passes the solution over a bed of activated clay. In one embodiment, the alkylene oxide is used in conjunction with a dicarbonyl compound. U.S. Pat. No. 2,978,442 uses acetylacetone to chelate the metal and passes the solution of polyethylene through an adsorbent column. U.S. Pat. No. 4,156,075 discloses a procedure involving boiling or washing the polyolefin with an alcohol such as butyl alcohol or isobutyl alcohol and then washing metal residues from the polyolefin. U.S. Pat. No. 4,430,488 teaches the addition of a carboxylate salt to a solution of polyethylene prepared by a solution polymerization process. The catalyst residues are not removed by adsorbents. A dilute solution (approximately 0.1% by weight) of acetylacetone in 2-butanol is used in comparative run 1 and the resultant polyethylene is reported to be green. U.S. Pat. No. 4,803,259 teaches a similar process using trialkanolamines as deactivators and no adsorbents. U.S. Pat. No. 5,426,175 adds a mixture of a dicarbonyl compound such as acetylacetone and an alkylene oxide to deactivate the catalyst and solubilize the catalyst residues. The catalyst residues are then washed out of the polymer with a suitable liquid such as n-heptane or a lower alkanol, preferably isopropanol or methanol.

The detrimental effect of metal contaminants has been recognized, and while there have been many attempts to solve this problem, a need remains. There are many compounds that can act as catalyst deactivators, but subsequent removal of the metal contaminants is difficult. Solvent washes are often expensive and inefficient. Some added compounds can have a detrimental effect on the polymer. One example of this is β-diketones such as acetylacetone. They are efficient chelating agents and can solubilize the metal contaminants for subsequent removal. However, they form degradation and condensation products which can cause poor thermal stability and poor color of the treated polyethylene. When alcohols alone are used, they can deactivate the catalyst, but they form insoluble materials that plug the adsorbent.

SUMMARY OF THE INVENTION

The invention is a process to remove metal contaminants from a hydrocarbon solution of polyethylene. A primary alcohol and a β-diketone are added to a solution of polyethylene at 120° C. to 300° C. and contacted with basic alumina. The process removes metal contaminants and minimizes degradation and condensation products, which can have a detrimental effect on polyethylene properties. The process is useful to remove catalyst residues from a solution polymerization of ethylene and provides polyethylene with low metal levels and good properties.

DETAILED DESCRIPTION OF THE INVENTION

The invention is a process to remove metal contaminants from a hydrocarbon solution of polyethylene. The metal contaminants can be from any source and have any valence greater than zero. The metal contaminants can be a single metal or a combination of metals. Typically, the source of the metal contaminants is the catalyst residue from the polymerization. A variety of catalysts are used in the polymerization of ethylene including Ziegler-Natta and single-site catalysts. Typically, other metallic compounds are also used in the polymerization and can become contaminants. For example, single-site catalysts generally use aluminum compounds as activators and Ziegler-Natta catalysts typically use an aluminum compound that serves as a cocatalyst. Other metals, such as compounds of magnesium or zinc, are also commonly used in ethylene polymerizations. Often, the metal contaminants are a mixture of metals in a variety of oxidation states.

Preferably, the metal contaminants removed in the process of the invention are catalyst residues. Preferably, the process removes metal contaminants based upon compounds of vanadium, titanium, aluminum, magnesium, zirconium, hafnium, chromium, niobium, iron, cobalt, nickel, and combinations thereof. More preferably, the metal contaminants are compounds of vanadium, titanium, aluminum, and combinations thereof.

The process removes metal contaminants from a hydrocarbon solution of polyethylene, including ethylene homopolymers and copolymers. The polyethylene can have different densities, molecular weights, and other properties, and it can be prepared by a variety of techniques, such as by a slurry, solution, or gas-phase polymerization process. Preferably, the polyethylene is prepared by a solution process. For examples of solution processes, see U.S. Pat. Nos. 3,218,266, 5,236,998, 6,221,985, and 6,756,455. In a solution process, the polyethylene is prepared in a hydrocarbon solution and is therefore particularly well-suited for removal of metal contaminants by the process of the invention.

Metal contaminants are removed from a hydrocarbon solution of polyethylene. If the polyethylene has been prepared by a solution process, the solution can be directly used. If the polyethylene has been prepared by another process or is not present in solution, it should first be dissolved in a hydrocarbon. Preferably, the hydrocarbon is saturated. Preferably, the hydrocarbon has a boiling point between about 30° C. and 150° C. If the boiling point is below 30° C., handling of the solvent can be difficult and polyethylene solubility will be low. If the boiling point is above 150° C., it can be difficult to remove the solvent from the polyethylene. Suitable solvents include aromatic solvents such as benzene, toluene, and o-xylene and aliphatic solvents such as pentanes, hexanes, heptanes, and octanes, including the cyclic isomers, and mixtures thereof.

The hydrocarbon solution of polyethylene is contacted with a β-diketone and a primary alcohol at a temperature within the range of 120° C. to 300° C. If the solution temperature is below 120° C., it is difficult to maintain good polymer solubility. If the temperature is above 300° C., higher pressures are required and thermal stability of the polyethylene can be a concern.

A primary alcohol and a β-diketone are added to the hydrocarbon solution of the polyethylene. Preferably, the primary alcohol and β-diketone are added as a mixture. Alternatively, they can be added separately, sequentially, or simultaneously, and in any desired order, to the hydrocarbon solution of polyethylene.

Suitable β-diketones have at least one hydrogen bonded to the carbon between the two carbonyl groups. The β-diketone may tautomerize to the enol form which chelates the metal. To form an enol, there must be at least one hydrogen bonded to the carbon between the two carbonyl groups. Acetylacetone is preferred. Suitable β-diketones include:

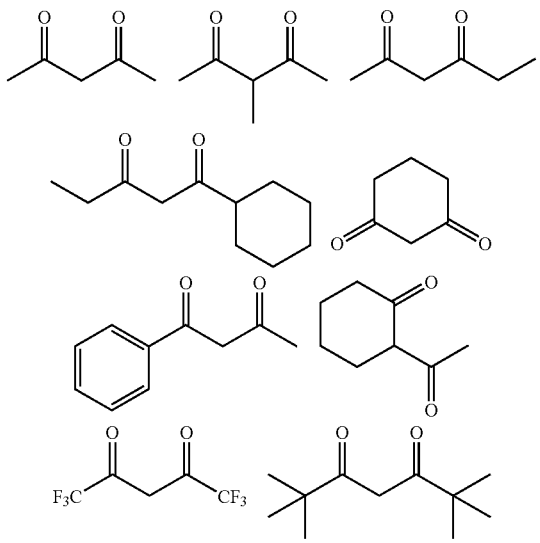

The β-diketone acts as a ligand to solubilize metal contaminants, which can then be adsorbed on basic alumina. However, the β-diketone is unstable and can decompose when adsorbed on the basic alumina. The decomposition products of the β-diketone form a variety of unsaturated products, mainly through aldol condensations. The unsaturated products will vary based upon the selection of the β-diketone, but they can be deleterious to polyethylene properties such as color or stability.

In addition to the β-diketone, a primary alcohol is added to the hydrocarbon solution of the polyethylene. We surprisingly found that the primary alcohol minimizes unsaturated products from the β-diketone. Suitable primary alcohols include methanol, ethanol, 1-propanol, 1-butanol, 1-hexanol, 1-octanol, benzyl alcohol, and 1,3-propanediol. Preferred primary alcohols are $C_2$-$C_8$ alcohols such as ethanol, 1-propanol, 1-butanol, 1-hexanol, 1-octanol, and mixtures thereof.

The molar ratio of β-diketone to primary alcohol is from 1:1 to 5:1, preferably from 2:1 to 4:1. The lower the amount of -diketone, the fewer the decomposition products from aldol condensation reactions. Because these condensation reactions follow second-order kinetics, changes in the amount of β-diketone have a pronounced effect. If the ratio is too high, an undesirable amount of unsaturated products form. Conversely, the β-diketone solubilizes the metal, so if the ratio is too low, insoluble metals can plug the adsorbent.

The β-diketone and primary alcohol are added to a solution of polyethylene and the solution is contacted with basic alumina. Basic alumina is a synthetic aluminum oxide that is essentially free of acidic residues. It is commonly freed of acidic residues through the addition of basic compound such as Group 1 or Group 2 metal oxides or metal hydroxides. Alumina manufacturers commonly calcine alumina with sodium carbonate to render it basic. The use of basic alumina is described, for example, in U.S. Pat. Nos. 3,058,800, 3,483, 338, 3,725,300, and 5,185,448. One test for basic alumina is to slurry the alumina in water and measure the pH. Preferably, a 5 weight percent slurry of the basic alumina in water has a pH within the range of 9 to 10. Alternatively, one can measure the amount of basic compound added to the alumina. In the case of sodium-treated alumina, one can determine the level of sodium by conventional analytical means such as x-ray fluorescence. The sodium level in a sodium-treated alumina can be expressed as the amount equivalent to a given amount of sodium oxide. The sodium level in the basic alumina is preferably equivalent to 1 to 2 wt % sodium oxide.

Preferably, the basic alumina consists of spheres with average particle sizes from about 3 mm to about 1.5 mm. Preferably, the basic alumina has a bulk density within the range of 0.6 g/cm$^3$ and 0.9 g/cm$^3$. The basic alumina adsorbs contaminants from the hydrocarbon solution of polyethylene. Preferably the surface area is within the range of 100 and 400 m$^2$/g. Preferably, the basic alumina has a substantial number of macropores that are large enough to allow soluble metal complexes to diffuse into the alumina. Preferably, the macroporosity ranges from 0.05 to 0.50 mL/g. Preferably, the basic alumina is sufficiently abrasion resistant and has sufficient crush strength to withstand normal handling, such as bed loading and contact with hot hydrocarbon solution. The strengths required to meet such handling requirements will depend upon the specific process in which the alumina is to be used.

The hydrocarbon solution of polyethylene can be contacted with the basic alumina by any of several methods. For example, basic alumina can be added to the solution, slurried, and then removed. The alumina can be removed by allowing it to settle and decanting or by filtration. In one preferred method, the solution is passed through a vessel containing basic alumina. Contact times can be varied. Generally, contact times of a few minutes are sufficient. Contact times of several hours may be used, but are usually not necessary.

The amounts of primary alcohol and β-diketone added to the hydrocarbon solution of the polyethylene depends upon the amount of metal contaminants, i.e., the greater the amount of metal contaminants, the greater the amount of the primary alcohol and β-diketone used. However, excessive amounts have a deleterious effect due to cost and resultant degradation impurities. Preferably, the primary alcohol and β-diketone are added to give a molar ratio of β-diketone to metal from 0.7:1 to 20:1, more preferably from 1:1 to 3:1.

The invention includes a process which comprises polymerizing ethylene in a hydrocarbon solvent with a transition metal catalyst at a temperature in the range of 120° C. to 300° C. A primary alcohol and a β-diketone are added, preferably as a mixture, and the solution is contacted with basic alumina. The molar ratio of β-diketone to primary alcohol is from 1:1 to 5:1. The process provides polyethylene with low metal levels and good properties.

The following examples merely illustrate the invention. Those skilled in the art will recognize many variations that are within the spirit of the invention and scope of the claims.

EXAMPLE 1

Model reactions are performed by heating a combination of acetylacetone, basic alumina, and an alcohol in a hexane solution. This simulates a portion of the chemistry that may occur when acetylacetone and an alcohol are added to a solution of polyethylene containing metal contaminants that is then passed through basic alumina.

Basic alumina (grade Polycel 860 available from Porocel Corp.) is dried at 300° C. for 24 hours under a nitrogen flow in a muffle furnace. The alumina is cooled to room temperature in a nitrogen-purged box. After cooling, it is taken into a nitrogen-purged glove bag and stored in a sealed bottle under nitrogen until ready for use. A clean, dry, 1-L Parr reactor (unstirred) is taken into the glove bag, and 66 mL of the alumina is placed into the Parr reactor. A solution consisting of acetylacetone (1.39 g, 13.9 mmol, from Wacker Chemie AG), 1-propanol (0.42 g, 7.0 mmol, from Fisher Scientific, Inc.), and hexane (125 g) is added to the Parr reactor. The reactor is sealed and placed in an oven at 200° C. for one hour. The reactor is removed and allowed to cool over one hour. The reactor is opened and a 10-mL aliquot of the reaction solution is taken. The reaction mixture is vacuum filtered with a Buchner funnel and Whatman filter paper to isolate the alumina. The alumina is allowed to dry on the filter paper for about 2 to 3 minutes until no physical signs of liquid are seen. It is not dried under vacuum or for an extended period of time.

The alumina is visually inspected and tested in a calorimeter (Hunter Lab Co.). YI (yellowness index), WI (whiteness index), L (lightness axis; 0=black; 100=white), a (red-green axis; positive values are red; negative values are green; 0 is neutral), and b (blue-yellow axis; positive values are yellow; negative values are blue; 0 is neutral) color values are determined. YI=24.7; WI=9.6; L=88.3; a=0.47; and b=13.1.

Enough alumina to fill a 10-mL vial is collected for headspace GC-MS analysis and the relative peak areas of acetone (peak area=303), isophorone (peak area=18), and 2-propanol (peak area=126) are recorded. The results are listed in Table 1.

Acetone is a decomposition product of acetylacetone. The presence of acetone indicates that the experimental conditions are sufficiently severe to cause decomposition. Isophorone is an unsaturated ketone. The level of isophorone produced from acetylacetone indicates the level of unsaturated condensation products thought to cause poor thermal stability and poor color in polyethylene. 2-Propanol most likely results from the reduction of either acetylacetone or acetone by the 1-propanol. The level of 2-propanol is thought to indicate innocuous ketone reduction rather than the formation of undesirable unsaturated condensation products.

COMPARATIVE EXAMPLE 2

The procedure of Example 1 is repeated with 1.55 g of acetylacetone and 67 mL of alumina except that no primary alcohol (1-propanol) is used. The alumina is visually inspected and tested. YI=40.6; WI=−44.8; L=84.3; a=0.58; and b=21.9.

Headspace GC-MS analysis is performed and the relative peak areas of acetone (peak area=214), isophorone (peak area=97), and 2-propanol (peak area=0) are recorded.

The alumina from Example 1 appears significantly less yellow than the alumina from Comparative Example 2. The YI is lower (24.7 versus 40.6) and the b value is also lower (13.1 versus 21.9). This indicates that when a primary alcohol is used in conjunction with a β-diketone, there is a decrease in degradation and condensation products which can cause poor thermal stability and poor color of the treated polyethylene.

The lower level of isophorone in Example 1 (area=18) versus Comparative Example 2 (area=97) indicates that a mixture of primary alcohol and β-diketone results in a lower formation of unsaturated condensation products thought to cause poor thermal stability and poor color in polyethylene.

The formation of 2-propanol (area=126) in Example 1 and no 2-propanol detected in Comparative Example 2 indicates that when a primary alcohol is used in conjunction with the acetylacetone, some of the acetone, a degradation product of acetylacetone, is being reduced to innocuous alcohol rather than reacting to form deleterious condensation products.

COMPARATIVE EXAMPLE 3

The procedure of Example 1 is repeated, with the exception of using 2-propanol rather than 1-propanol and using a molar ratio of β-diketone to alcohol of 3:1. The results are listed in Table 1.

COMPARATIVE EXAMPLE 4

The procedure of Example 1 is repeated, with the exception of using t-butanol rather than 1-propanol and using a molar ratio of β-diketone to alcohol of 3:1.

EXAMPLE 5

The procedure of Example 1 is repeated, with the exception of using 1-butanol rather than 1-propanol and using a molar ratio of β-diketone to alcohol of 2:1.

TABLE 1

| | | | Alumina Analyses | | | | |
|---|---|---|---|---|---|---|---|
| Example | Alcohol | Molar ratio | YI | b value | Isophorone area | 2-Propanol area | Acetone area |
| 1 | 1-propanol | 2:1 | 24.7 | 13.1 | 18 | 126 | 303 |
| C2 | none | NA | 40.6 | 21.9 | 97 | 0 | 214 |
| C3 | 2-propanol | 3:1 | 38.3 | 19.7 | 140 | NA | 323 |
| C4 | t-butanol | 3:1 | 36.6 | 18.5 | 162 | 0 | 281 |
| 5 | 1-butanol | 2:1 | 28.0 | 15.0 | 15 | 168 | 315 |

Example 5 demonstrates that a large decrease in isophorone level and remarkable color improvement are observed with the primary alcohol, 1-butanol. In contrast, Comparative Examples 3 and 4 show that the color improvement and large decrease in isophorone observed in Examples 1 and 5 are not achieved. This indicates that secondary and tertiary alcohols are not as effective as primary alcohols.

EXAMPLE 6

The procedure of Example 1 is repeated, with a molar ratio of β-diketone to 1-propanol of 3:1.

COMPARATIVE EXAMPLE 7

The procedure of Comparative Example 2 is repeated.

EXAMPLE 8

The procedure of Example 1 is repeated, with the exception of using methanol rather than 1-propanol and using a molar ratio of β-diketone to alcohol of 3:1.

EXAMPLE 9

The procedure of Example 1 is repeated, with the exception of using ethanol rather than 1-propanol and using a molar ratio of β-diketone to alcohol of 3:1.

EXAMPLE 10

The procedure of Example 1 is repeated, with the exception of using 1-butanol rather than 1-propanol and using a molar ratio of β-diketone to alcohol of 3:1.

The alumina from Example 6, Comparative Example 7, and Examples 8-10, is analyzed at the same time by headspace GC-MS. The results are reported in Table 2.

TABLE 2

| | | Alumina Analyses | | | |
|---|---|---|---|---|---|
| Example | Alcohol | Molar ratio | Isophorone area | 2-Propanol area | Acetone area |
| 6 | 1-propanol | 3:1 | 17 | 145 | 233 |
| C7 | none | NA | 115 | 0 | 205 |
| 8 | methanol | 3:1 | 89 | 15 | 200 |
| 9 | ethanol | 3:1 | 39 | 129 | 196 |
| 10 | 1-butanol | 3:1 | 28 | 142 | 228 |

The results in Table 2 show the decrease in isophorone level when a primary alcohol is used with the acetylacetone. This indicates that a mixture of primary alcohol and β-diketone results in a lower formation of unsaturated condensation products thought to cause poor thermal stability and poor color in polyethylene. The formation of 2-propanol confirms that when a primary alcohol is used in conjunction with the acetylacetone, some of the acetone, a degradation product of acetylacetone, is being reduced to innocuous alcohol rather than reacting to form deleterious condensation products. The results also show that a $C_2$ to $C_8$ primary alcohol is preferable to methanol.

The results in Tables 1 and 2 show that 1-propanol and 1-butanol are particularly effective at reducing isophorone levels at acetylacetone:alcohol molar ratios ranging from 2:1 to 3:1. Therefore, the superior performance of primary alcohols compared with secondary or tertiary alcohols which was demonstrated in Table 1 is not due to concentration differences.

The preceding examples are meant only as illustrations. The following claims define the invention.

We claim:

1. A process to remove metal contaminants from a hydrocarbon solution of polyethylene, which comprises adding a primary alcohol and a β-diketone to a solution of polyethylene at a temperature within the range of 120° C. to 300° C. and contacting the solution with basic alumina wherein the molar ratio of β-diketone to primary alcohol is from 1:1 to 5:1.

2. The process of claim 1 wherein the metal contaminants are catalyst residues.

3. The process of claim 1 wherein the metal contaminants are selected from the group consisting of vanadium, titanium, aluminum, magnesium, zirconium, hafnium, chromium, niobium, iron, cobalt, nickel, and combinations thereof.

4. The process of claim 3 wherein the metal contaminants are selected from the group consisting of vanadium, titanium, aluminum, and combinations thereof.

5. The process of claim 1 wherein the molar ratio of β-diketone to primary alcohol is from 2:1 to 4:1.

6. The process of claim 1 wherein the β-diketone is acetylacetone.

7. The process of claim 1 wherein the primary alcohol is a $C_2$ to $C_8$ alcohol.

8. The process of claim 7 wherein the alcohol is selected from the group consisting of ethanol, 1-propanol, 1-butanol, 1-hexanol, 1-octanol, and mixtures thereof.

9. The process of claim 1 wherein the primary alcohol and the β-diketone are added as a mixture.

10. A process which comprises polymerizing ethylene in a hydrocarbon solvent with a transition metal catalyst at a temperature within the range of 120° C. to 300° C.; adding a primary alcohol and a β-diketone; and contacting the solution with basic alumina wherein the molar ratio of β-diketone to primary alcohol is from 1:1 to 5:1.

11. The process of claim 10 wherein the primary alcohol and the β-diketone are added as a mixture.

* * * * *